No. 680,097. Patented Aug. 6, 1901.
M. T. WHITE.
PEA THRESHER.
(Application filed May 23, 1900.)
(No Model.) 2 Sheets—Sheet 2.
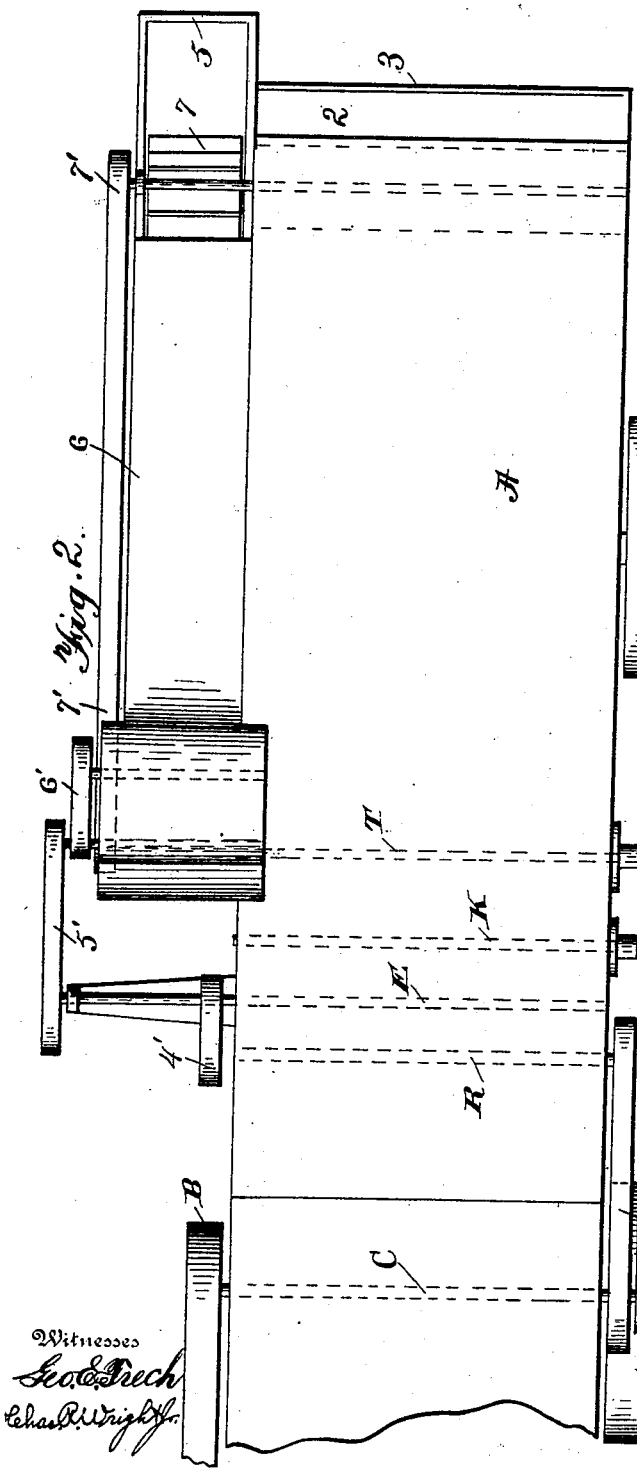
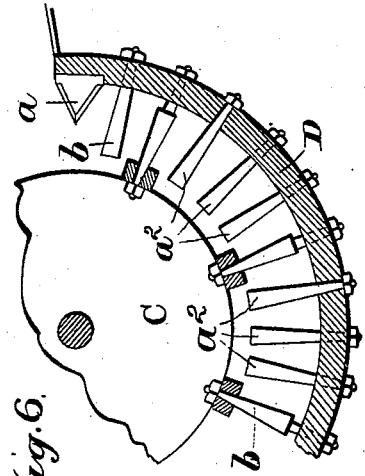
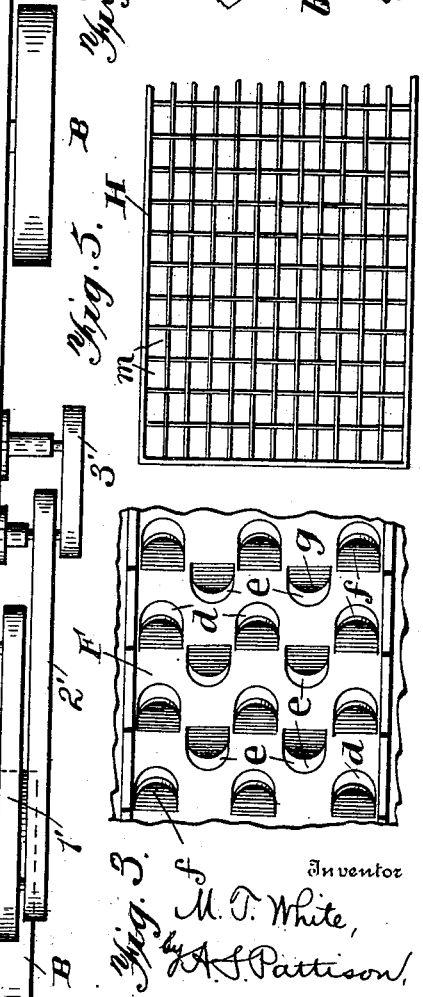
Witnesses
Geo. E. Frech
Chas. R. Wright Jr.
Inventor
M. T. White,
by A. S. Pattison,
Attorney.
THE NORRIS PETERS CO., PHOTO-LITHO., WASHINGTON, D. C.

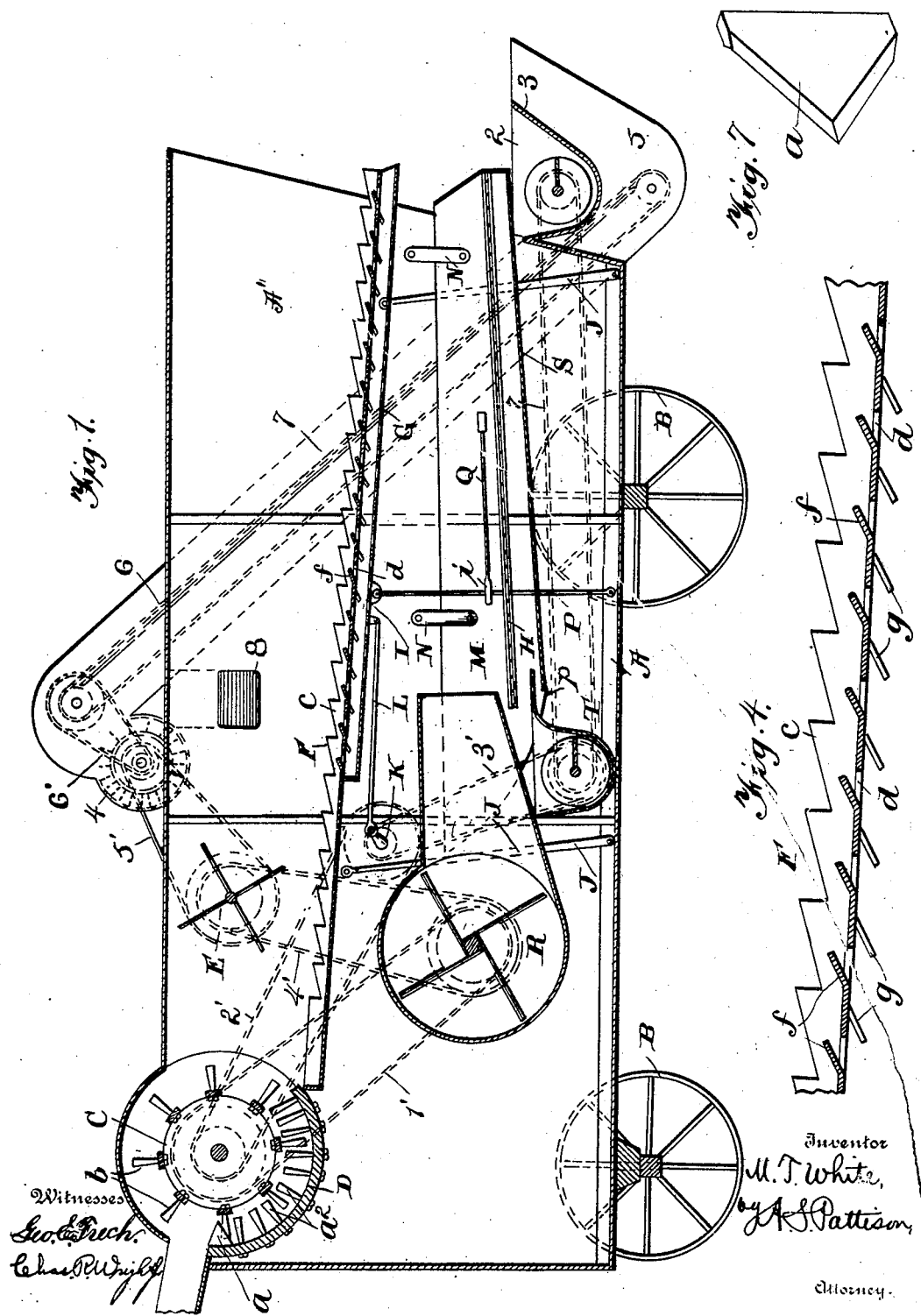

UNITED STATES PATENT OFFICE.

MARTIN T. WHITE, OF MAURY CITY, TENNESSEE.

PEA-THRESHER.

SPECIFICATION forming part of Letters Patent No. 680,097, dated August 6, 1901.

Application filed May 23, 1900. Serial No. 17,671. (No model.)

*To all whom it may concern:*

Be it known that I, MARTIN T. WHITE, a citizen of the United States, residing at Maury City, in the county of Crockett and State of Tennessee, have invented new and useful Improvements in Pea-Threshers, of which the following is a specification.

My invention relates to improvements in pea-threshers; and it pertains to a thresher, as hereinafter shown and described, whereby the peas are threshed from the vines and their pods and separated.

In the accompanying drawings, Figure 1 is a vertical sectional view of a thresher embodying my invention. Fig. 2 is a top plan view of the same. Fig. 3 is an enlarged plan view of a portion of the reciprocating pan provided with perforations having oppositely-inclined lips. Fig. 4 is a vertical sectional view of Fig. 3. Fig. 5 is a top plan view (full size) of a portion of the lower screen. Fig. 6 is a sectional view of a portion of the primary concave. Fig. 7 is a detached view of one of the primary concave knives.

Referring now to the drawings, B indicates the framework of the machine; A is the bottom beam, to which are journaled in any desired manner the usual supporting-wheels B, by means of which the machine may be conveyed from place to place.

C is what I term my "primary threshing-cylinder," and D my "primary coacting threshing-concave," the said concave provided with a plurality of transversely-arranged teeth $a^2$ and one row of triangular-shaped knives $a$ in front projecting upward and inward therefrom, and between which the teeth $b$, projecting from the periphery of the threshing-cylinder C, pass, the teeth $b$ upon the cylinder C being preferably arranged in staggering relation and adapted, as just stated, to pass between the projecting teeth $a^2$ and knives $a$ of the primary threshing-concave D. The peas and the vines are placed in this threshing-cylinder, and the teeth $b$ and teeth $a^2$ and knives $a$ serve to thresh and separate about eight-tenths of the peas from their pods, and the knives $a$ serve to cut up the vines or hay into small pieces, which prevents the vine from becoming wrapped around the teeth of an ordinary concave and cylinder, which would serve to interfere with the operation of the machine and also making it heavy and hard to run. The hay or vines being cut into small pieces it becomes lighter than the peas and is more readily separated therefrom through the medium of the mechanism which I will now describe.

The cylinder C revolves about three hundred revolutions per minute, and the vines and peas are thrown thereby against the beater E, which checks them and causes them to drop down upon the shaker-pan F. This shaker-pan F extends from just under the inner side or edge of the primary threshing-cylinder to the rear end of the machine, and situated within this pan and connected to the bottom thereof are a plurality of bars $c$, having rearwardly-projecting ratchet-shaped teeth, which serve when the pan is being reciprocated (in a manner to be presently described) to cause the cut hay and pods to be fed rearward and over the ends thereof upon any suitable conveyer situated there to receive it, such as is usually used in connection with the threshing-machines, and as that forms no part of my invention need not here be shown or described.

The shaker-pan F has its bottom provided with a plurality of U-shaped perforations $d$ and $e$, the said perforations arranged in alternate rows, as illustrated in Fig. 3. The perforations $d$ have upwardly-inclined lips or deflecting-plates $f$, which are in effect constituted by the manner of cutting the opening, as will be readily understood, and the perforations $e$ are provided with corresponding but oppositely and downwardly inclined deflectors or walls $g$. Situated below the pan F is a screen G, which is preferably provided with round holes and through which the separated peas pass and drop upon a screen H, which is of a peculiar form, to be hereinafter described.

The upper reciprocating separating mechanism consists of a pad F, which is situated a little below the threshing-cylinder C, and has secured thereto a short distance below a screen G. The said upper separating mechanism is supported upon supports J, which have their upper ends pivotally connected thereto and their lower ends pivotally connected to the beam A a little in the rear of the connection with the separator, so that the supports are slightly inclined forward. A crank-shaft K has one end of pitman L connected therewith and the opposite end of the pitman connected with the upper separating mechanism, whereby the said mechanism is reciprocated by the rotation of the cranks to shaft K, as will be readily understood. The lower separating mechanism M is suspended by the side of the frame A' through the medium of the depending legs N, which have their respective ends pivotally connected, respectively, with the upper part of the frame A' and the lower separating mechanism. The lower separating mechanism M, which carries the screen H, (before briefly referred to,) is reciprocated by the reciprocation of the upper separating mechanism through the medium of a bar P, which has its lower end pivotally connected to the beam A and its upper end connected with the upper separating mechanism I. A rod Q has one end rigidly connected with the lower separating mechanism M and its opposite end provided with an eye or loop $i$, which surrounds the vertically-arranged rod P. This loop of the rod Q engaging the vertical bar P about half-way its length and the vertical bar P being vibrated by the upper separating mechanism I it will be seen that the lower separating mechanism M is vibrated about one-half the distance the upper separating mechanism is vibrated. The upper separating mechanism consists of the shaker-pan and the screen G, which is attached thereto, but below it, and the shaker-pan is provided with upwardly-projecting side walls.

The object in having the vertically-arranged supports J extending slightly backward of a vertical line is to cause a backward jumping movement to be given the shaker-pan, whereby the hay or vines are more effectively moved to the rear end of the machine to be conveyed away.

The peculiar construction of the perforations with oppositely-extending inclined deflectors is that the perforations which have the downwardly-inclined deflectors constitute openings through which the separated peas will more readily pass onto the screen G, and through the medium of the blower or fan R a draft is conveyed through these perforations, owing to their inclined deflecting-walls, in a rearward direction, which assists the shaker-pan and the notched bars therein in conveying the cut hay to the rear of the machine, as will be readily understood.

For the purpose of more effectively separating the injured and broken peas from the whole and select peas the screen H is provided with transversely-elongated meshes $m$. (Shown full size in Fig. 5.) The broken, injured, and imperfect peas will fall through this peculiarly-shaped screen onto a sheet-iron inclined bottom S and pass out through an opening $p$, situated just beyond the trough conveyer T, while the good, firm, and perfect peas will fall into the said trough conveyer and be conveyed thereby into a bag or other receptacle situated at the end of the trough to receive them. The trough conveyer T is of the usual form and need not be specifically described or illustrated herein, as it is well understood by those skilled in the art. The fan R, in addition to furnishing a blast through the shaker-pan, as before described, also furnishes a blast to the top of the screen H and serves to remove any small particles and rubbish from the peas before they reach the conveyer T and to blow them out through the rear end of the machine.

It is found in practice that the passage of the peas through the primary threshing-cylinder C and concave D of machines for this purpose would not thoroughly thresh all of the peas and that about two-tenths of the peas would remain unthreshed in broken portions of the pods, &c. It is my object to prevent a waste of this two-tenths of the peas. In order to accomplish this result, I provide a trough conveyer 2, situated across the rear end of the machine and below the outer end of the shaker-pan, below the outer ends of the screens G and H. The outer wall 3 of this trough extends upward and outward and is adapted to catch the pods containing peas, which, owing to their weight, will drop into this trough, while the hay and separated pods will be thrown by the fan beyond the trough 2 and upon the conveyer, which may be situated there to receive it, as before explained.

Supported by the upper portion of the machine is what I term a "secondary" threshing cylinder and concave 4, which is about half the diameter of the primary concave and cylinder and which has shorter teeth, the teeth being preferably set nearer together, but the ends of the teeth about the same distance from the inner wall of the concave. This secondary cylinder is revolved about one and two-thirds faster than the primary cylinder, which makes about one-fifth more velocity on the periphery than the primary, which I find to be very essential and necessary in a machine of this character in order to accomplish the end in view.

Situated under one end of the trough conveyer 2 is a suitable receptacle or chamber 5, which receives from the said conveyer the unthreshed pea-pods, which are carried thereby, as will be readily understood.

An upwardly-inclined conveyer-casing 6 has its lower end connected with the chamber 5 and its upper end situated just above the secondary threshing cylinder and concave 4. Situated within this conveyer-casing is an endless conveyer 7, (shown in dotted lines, Fig. 1,) of any well-known form, which will convey the unthreshed pods from the chamber 5 and deliver them to the secondary concave and cylinder to be rethreshed and from which they pass through a suitable spout 8 into the machine to be separated, as before described in respect to the peas which are separated from the pods by the primary cylinder and concave.

The secondary cylinder has only a small amount of work to perform—namely, the threshing of those pods which have not been threshed by the primary cylinder—and by performing this operation separately and distinct from the primary cylinder, which, as before stated, is already overloaded or overworked, which causes the imperfect separation of the pods, I am enabled to accomplish by the use of a primary and a secondary threshing mechanism a thorough separation of all of the peas and to prevent the waste of two-tenths, which occurs where only a primary cylinder and concave are used.

By means of a machine constructed as herein shown and described I am enabled to thoroughly thresh and separate the peas and to prevent any waste thereof, and which is found to be a great saving in pea-threshing machines.

My machine is driven from the primary cylinder, which will be suitably connected with the source of power, such as an engine. A belt 1' connects the fan R with said primary cylinder at its left-hand end. The crank-shaft K is driven by a belt 2' at the same end of the spindle of said primary cylinder as the belt 1'. The conveyer T for conveying the shelled and cleaned peas to the receptacle for receiving them is driven by belt 3', passing around a pulley at the left-hand end of the crank-shaft K. The beater is driven from a pulley 4', situated on the right side of the machine. The secondary cylinder is driven from a pulley 5' on the left end of the beater-shaft. The conveyer situated in trough 6 is driven from a pulley and belt 6' on the left end of the secondary-cylinder shaft, and the tailings-auger is driven from a pulley and belt 7' on the right end of the conveyer 7.

Having thus described my invention, what I claim, and desire to secure by Letters Patent, is—

1. A pea-thresher comprising a threshing mechanism, a separator comprising an upper reciprocating member, an independent lower reciprocating member, a vertically-arranged bar having one end connected with the upper reciprocating member, and a connection between the said bar at a point intermediate its ends and the lower reciprocating member of the separator whereby the movement of the upper member causes a reciprocation of the lower member, substantially as described.

2. A pea-thresher comprising a threshing mechanism, and a separating mechanism including a horizontally-reciprocating member, and vertically-arranged supports having their lower ends connected with the frame of the machine and their upper ends connected with the said reciprocating member, the vertically-arranged supports being inclined slightly rearward of a vertical line, and a separating member provided with rearward-projecting teeth, the parts adapted to operate substantially as described.

3. A pea-thresher comprising a supporting-frame, a threshing-cylinder therein, a reciprocating sieve below said cylinder, vertically-arranged rearwardly-inclined supports having their lower ends pivotally connected to frame and upper ends to the sieve, a lower reciprocating sieve, supporting-links having their upper ends pivotally connected to the sieve and the lower ends to the frame, an operating-bar pivotally connected to the upper sieve and the frame, and a lever having one end connected to the lower sieve and the other end adapted to receive the said bar, substantially as described.

In testimony whereof I have hereunto set my hand in the presence of two subscribing witnesses.

MARTIN T. WHITE.

Witnesses:
J. H. CHANDLER,
S. G. BOOTH.